US011882520B2

(12) United States Patent
Cunningham

(10) Patent No.: US 11,882,520 B2
(45) Date of Patent: *Jan. 23, 2024

(54) SYSTEMS AND METHODS FOR MANAGEMENT OF NETWORK CONGESTION

(71) Applicant: Comcast Cable Communications, LLC, Philadelphia, PA (US)

(72) Inventor: Ryan Michael Cunningham, Haddon Heights, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/156,115

(22) Filed: Jan. 18, 2023

(65) Prior Publication Data

US 2023/0189138 A1 Jun. 15, 2023

Related U.S. Application Data

(63) Continuation of application No. 17/493,241, filed on Oct. 4, 2021, now Pat. No. 11,589,304, which is a
(Continued)

(51) Int. Cl.
*H04B 1/38* (2015.01)
*H04W 52/02* (2009.01)
(Continued)

(52) U.S. Cl.
CPC ....... *H04W 52/0209* (2013.01); *G01S 5/0284* (2013.01); *H04B 17/336* (2015.01); *H04W 74/0808* (2013.01)

(58) Field of Classification Search
CPC .......... H04W 52/0209; H04W 74/0808; H04B 17/336; G01S 5/0284
See application file for complete search history.

(56) References Cited

U.S. PATENT DOCUMENTS 8,509,135 B2 8/2013 Kwun
9,084,213 B2 7/2015 Wang et al.
(Continued)

OTHER PUBLICATIONS

US Patent Application filed on Oct. 4, 2021, entitled "Systems and Methods for Management of Network Congestion", U.S. Appl. No. 17/493,241.
(Continued)

*Primary Examiner* — Nhan T Le
(74) *Attorney, Agent, or Firm* — BakerHostetler

(57) ABSTRACT

Methods and systems are for managing congestion in a network of devices are disclosed. A method may comprise identifying one or more battery-operated devices. A signal-to-noise ratio (SNR) and a signal-to-interference ratio (SIR) for each battery-operated device may be determined. Based on the SNR and SIR of each battery-operated device, a battery loss using clear channel assessment (CCA) and a battery savings using CCA may be determined. A total battery savings may be compared to a total battery loss to determine that the total battery savings is greater than the total battery loss. Based on the determination that the total battery savings is greater than the total battery loss, a noise may be generated to block transmission from the one or more battery-operated devices.

30 Claims, 4 Drawing Sheets

Related U.S. Application Data continuation of application No. 17/247,429, filed on Dec. 10, 2020, now Pat. No. 11,166,231.

(51) Int. Cl.
*G01S 5/02* (2010.01)
*H04W 74/08* (2009.01)
*H04B 17/336* (2015.01)

(56) References Cited

U.S. PATENT DOCUMENTS

| | | |
|---|---|---|
| 9,628,166 B2 | 4/2017 | Homchaudhuri et al. |
| 9,706,490 B2 | 7/2017 | Legg et al. |
| 10,206,228 B2 | 2/2019 | Bhargava et al. |
| 10,425,901 B2 | 9/2019 | Islam et al. |
| 11,166,231 B1* | 11/2021 | Cunningham ....... H04B 17/336 |
| 11,589,304 B2* | 2/2023 | Cunningham .... H04W 52/0209 |
| 2015/0319700 A1 | 11/2015 | Oteri et al. |
| 2017/0048882 A1* | 2/2017 | Li .......................... H04L 5/0094 |
| 2021/0084648 A1* | 3/2021 | Gilmore ............ H04W 72/0453 |

OTHER PUBLICATIONS

US Patent Application filed on Dec. 10, 2020, entitled "Systems and Methods for Management of Network Congestion", U.S. Appl. No. 17/247,429.

* cited by examiner

SYSTEMS AND METHODS FOR MANAGEMENT OF NETWORK CONGESTION

CROSS-REFERENCE TO RELATED APPLICATIONS

This application is a continuation of U.S. patent application Ser. No. 17/493,241, filed Oct. 4, 2021, now U.S. Pat. No. 11,589,304, issued Feb. 21, 2023, which is a continuation of U.S. patent application Ser. No. 17/247,429, filed Dec. 10, 2020, now U.S. Pat. No. 11,166,231 issued Nov. 2, 2021, which are hereby incorporated by reference in their entireties.

BACKGROUND

Multiple devices, such as Bluetooth devices, Zigbee devices, Wi-Fi devices, and Thread devices, may connect to a single network. The devices may connect to the network using the same frequency band. However, multiple devices utilizing a single frequency band may cause congestion of the frequency band. The congestion may negatively impact performance of the devices. For example, the congestion may adversely affect device communication. As another example, the congestion may damage device battery life. Therefore, improvements in network management techniques are needed.

SUMMARY

Methods and systems are disclosed for managing congestion in a network of devices. One or more battery-operated devices may be connected to a single network. The one or more battery-operated devices may interfere with each other's ability to receive an inbound signal. For each of the one or more battery-operated devices unable to receive an inbound signal, a battery loss using clear channel assessment (CCA) may be determined. For each of the one or more battery-operated devices able to receive an inbound signal, a battery savings using CCA may be determined. Based on a determination that a total battery savings in the network is greater than a total battery loss in the network, a noise may be generated. By generating a noise, transmission from the one or more battery-operated devices may be blocked and the overall battery life of the one or more battery-operated devices in the network may be improved.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
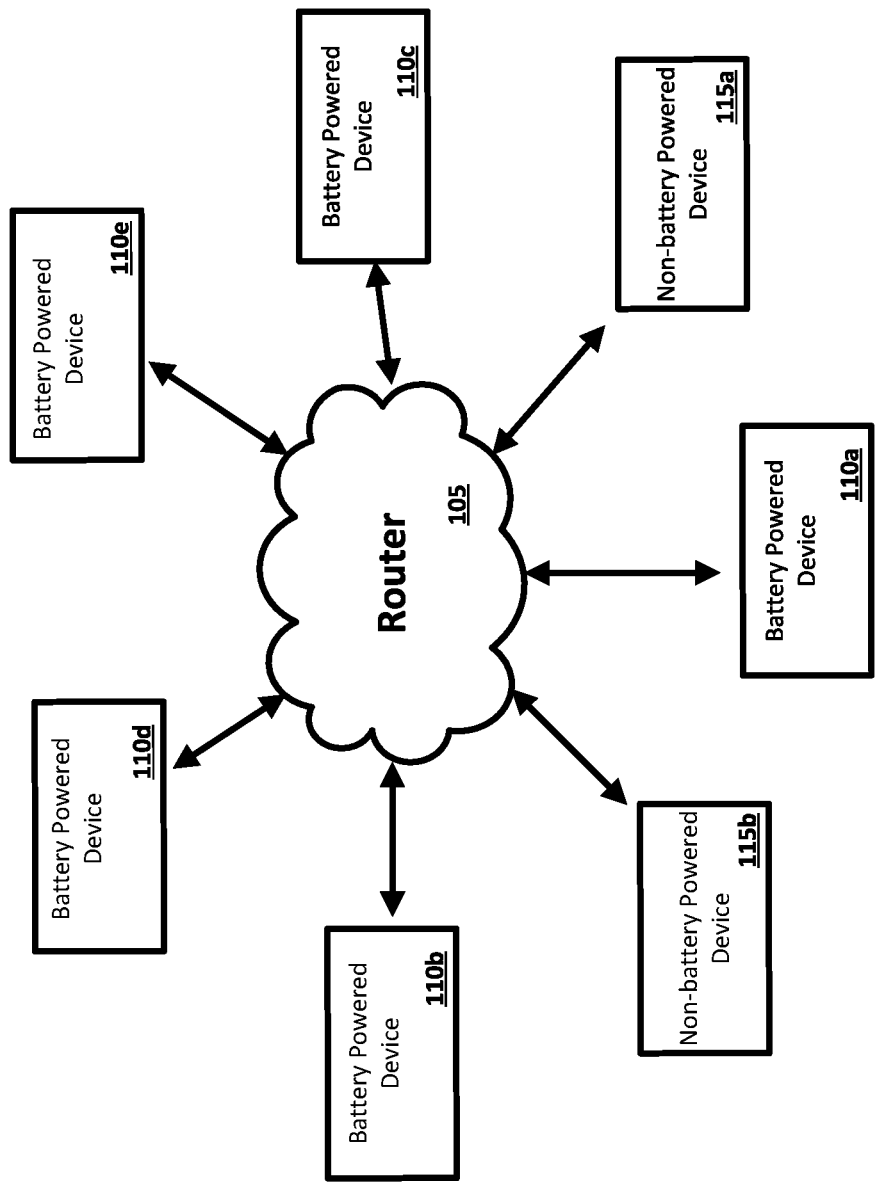
FIG. 1 illustrates a block diagram of an example system according to an embodiment of the present disclosure.

A number of devices, such as wireless devices, connected to a single network may utilize the same frequency band. The frequency band may experience congestion. A particular frequency band may experience congestion if a large number of devices utilize that frequency band. For example, the unlicensed 2.4 GHz ISM band is becoming increasingly congested. As throughput requirements increase in the average home, congestion of the 2.4 GHz ISM band may become exponentially worse and devices supporting protocols utilizing the 2.4 GHz ISM band, such as Bluetooth Low Energy (BLE), Thread, and Zigbee devices, may have difficulty co-existing with Wi-fi devices and within other in-band high throughput protocols.

If a frequency band is congested, some of the devices utilizing that frequency band may experience communication failures or battery failures. For example, some of the devices utilizing that frequency band may not be able to successfully transmit a packet to a receiver and may not be able to receive an inbound signal. If one or more of the devices is a battery-powered device, these battery-powered devices may need to re-transmit a packet to the receiver multiple times before it is successfully received. Each time a device re-transmits a packet to the receiver, energy from a battery of that device is consumed.

If one or more of the devices utilizing the frequency band are wireless devices, such as Wi-fi or Zigbee devices, these wireless devices may employ clear-channel-assessment (CCA) prior to transmitting a packet to determine if there is too much noise to successfully transmit a packet. When a wireless device employs CCA, it detects an energy on the frequency band and compares the detected energy with a CCA parameter value. If the detected energy exceeds the CCA parameter value, this may indicate that there is too much noise to successfully transmit a packet and the device may not transmit the packet. By employing CCA, a device may avoid repeated, failed attempts to transmit a packet—thus saving battery consumption associated with each re-transmission. However, a portion of the device's battery life may nevertheless be consumed each time the device employs CCA. Additionally, CCA may produce a false positive (i.e. indicate that there is not too much noise to successfully transmit a packet when there actually is too much noise to successfully transmit a packet).

Thus, it may be desirable to provide a mechanism to manage congestion in a network of devices. It may also be desirable to provide a mechanism to improve the battery life of battery-operated devices in a network of devices. Disclosed herein are methods and systems for preventing transmission from devices in a network by forcing one or more devices in the network into CCA mode. A device that has been forced into CCA mode will not transmit packets to the receiver, thus reducing congestion in the network and improving the battery life of that device. To force a device in the network into CCA mode, noise may be generated. This generated noise may be used to "trick" the device into thinking that there is too much noise to successfully transmit a packet, without the device ever having to actually perform CCA assessments.

FIG. 1 shows a block diagram illustrating an exemplary system for performing the disclosed methods. This exemplary system is only an example of a system and is not intended to suggest any limitation as to the structure of the system. Neither should the system be interpreted as having any dependency or requirement relating to any one or combination of components illustrated in the exemplary system.

The system may comprise a router 105, one or more battery-operated devices 110*a-e* and one or more non-battery-operated devices 115*a-b*. The one or more battery-operated devices 110a-e and the one or more non-battery-operated devices 115a-b may be in communication with the router 105. For example, the battery-operated devices may include at least one of a Wi-Fi device, a ZigBee device, a Bluetooth Low Energy (BLE) device, and a Thread device. Logical connections between the router 105, the non-battery-operated devices 115a-b, and the battery-operated devices 110a-e may be made via a network 100, such as a local area network (LAN). Such networked systems are conventional and commonplace in dwellings and offices.

Figure 2:
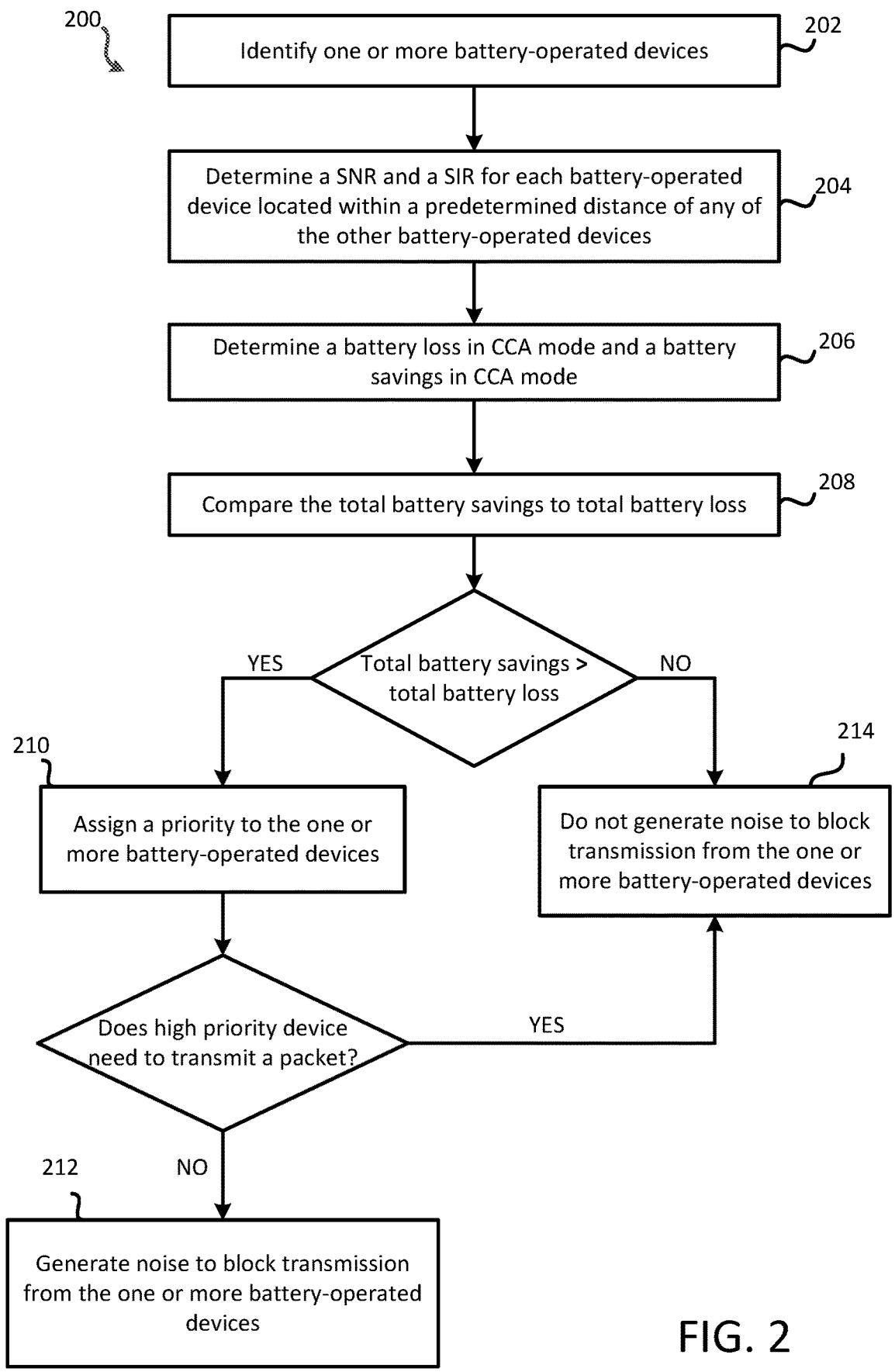
FIG. 2 illustrates a flow chart of an example method according to an embodiment of the present disclosure.

FIG. 2 shows a flow chart of an example method 200 for network management. The method 200 may be used to prevent transmission from one or more battery-operated devices in a network by forcing the battery-operated devices into CCA mode. As discussed above, a device that has been forced into CCA mode will not transmit packets to the receiver, thus reducing congestion in the network and improving the battery life of that device. To force a device in the network into CCA mode, noise may be generated to "trick" the device into thinking that there is too much noise to successfully transmit a packet, without the device ever having to actually employ CCA. However, if a noise is generated to force a device in the network into CCA mode, the noise may impact all devices in the network. If the noise impacts all devices in the network, each battery-operated device in the network may be forced into CCA mode even if the device is not losing battery life during a "normal transmission" mode. To determine if the network, as a whole, would benefit from being forced into CCA mode, a SNR and SIR for each battery-operated device in the network may be used to determine a net effect of forced CCA on the network.

It may be beneficial to force devices in a network into CCA mode if one or more of the devices are battery-operated devices. At step 202, one or more battery-operated devices in a single network may be identified. The one or more battery-operated devices identified may be using the same operating channel. Identifying the one or more battery-operated devices may comprise identifying a plurality of devices in a network, such as the network 100 shown in FIG. 1. For example, the plurality of devices in the network 100 may include both battery-operated devices, such as the battery-operated devices 110a-e, and non-battery-operated devices, such as the non-battery-operated devices 115a-b. Identifying the one or more battery-operated devices may also comprise determining that one or more devices in the plurality of devices is battery-operated. For example, in the network 100, it may be determined that the battery-operated devices 110a-e are battery-operated.

A battery-operated device may be susceptible to interference from other battery-operated devices in the network. For example, a first battery-operated device may be particularly susceptible to interference from other battery-operated devices that are located proximate to the first battery operated device, such as other battery-operated devices that are located within a predetermined distance of the first battery-operated device. Different types of battery-operated devices may be more or less likely to cause interference. For example, a Wi-fi battery-operated device may be more likely to cause interference than a Zigbee battery-operated device because the Wi-fi device may operate in a broader frequency band than the Zigbee device. As a result, if a first battery-operated device in the network is susceptible to interference from a second battery-operated device located within a predetermined distance of the first battery-operated device, the predetermined distance may vary between different types of battery-operated devices. For example, the predetermined distance may be larger if the second battery-operated device is a Wi-fi device than if the second battery-operated device is a Zigbee device.

The SNR and SIR associated with a battery-operated device may be used, at least in part, to determine whether it may be beneficial to force the battery-operated devices in the network into CCA mode. The SNR associated with a battery-operated device may indicate a measurement of a signal strength of that device relative to background noise. The SIR associated with a battery-operated device may be similar to the SNR associated with that device, but instead of indicating a measurement of signal strength relative to background noise, the SIR may indicate a measurement of signal strength relative to interference from devices operating on the same frequency band. At step 204, a SNR and a SIR may be determined for each of the one or more battery-operated devices in the network, such as each of the one or more battery-operated devices in the network that are located within a predetermined distance of any of the other one or more battery-operated devices.

The SNR for a device may indicate whether the device is capable of receiving an inbound signal in the network in the presence of background noise, not taking into account interference from other devices operating on the same frequency band. If the device is not even capable of receiving an inbound signal when interference from other devices operating on the same frequency band is not present, then the device will not be able to receive a signal in the presence of interference from other devices operating on the same frequency band. If the device is not able to receive a signal even in the absence of interference from other devices operating on the same frequency band, the device will inevitably lose battery life if it is operating in a "normal transmission" mode. In a "normal transmission" mode, the device may be making repeated attempts to transmit a packet to a receiver. As the device is not able to receive a signal, each of these repeated attempts may be unsuccessful. Each unsuccessful retransmission may reduce the battery life of the device. The loss of battery life for the device may be minimized by forcing the device to operate in CCA mode rather than in "normal transmission" mode. As discussed above, a device that has been forced into CCA mode will stop transmitting packets to the receiver, without ever having employed CCA. If the device stops making repeated, failed attempts to transmit packets to the receiver, the battery life of the device may be improved.

The SIR for a device may indicate whether the device is capable of receiving an inbound signal in the presence of interference from other devices operating on the same frequency band. For example, the SNR of a device may indicate that the device is able to receive a signal in the presence of background noise, but the SIR for that same device may indicate that the device is not able to receive a signal in the presence of interference from other devices operating on the same frequency band. If a device is not capable of receiving an inbound signal in the presence of interference from other devices operating on the same frequency band, the device may be losing battery life if it is operating in the "normal transmission" mode. If the device is operating in a "normal transmission" mode, the device may be repeatedly transmitting packets to the receiver. Due to the interference from the other battery-operated devices operating on the same frequency band, one or more of these repeated attempts may be unsuccessful. For example, the device may have to re-transmit a packet multiple times before the receiver successfully receives it. An opportunity to save battery life of the device may exist by forcing the device out of "normal transmission" mode into CCA mode. As discussed above, a device that has been forced into CCA mode will stop transmitting packets to the receiver, without ever having employed CCA. If the device stops making repeated, failed attempts to transmit packets to the receiver, the battery-life of the device may be improved.

The SNR and SIR may be determined using standard techniques. Determining the SNR and the SIR for each of the one or more battery operated devices in the network may comprise determining a distance from each of the one or more battery-operated devices to a receiver, such as the router 105 shown in FIG. 1. The distance from each of the one or more battery-operated devices to the receiver may be determined dynamically or received from a remote device on a real-time basis. If the receiver comprises two or more antennas, determining the distance from each of the one or more battery operated devices to the receiver may comprise determining an angle between each of the one or more battery operated devices and the receiver. Each angle may be determined using an angle of arrival (AoA) for a signal transmitted from each of the one or more battery-operated devices to the receiver.

Determining the SNR and the SIR for each of the one or more battery operated devices in the network may comprise determining the SNR and the SIR for each of the one or more battery operated devices that is located within a predetermined distance of any of the other one or more battery operated devices, a subset of the one or more battery-operated devices located within the predetermined distance of any of the other one or more battery-operated devices may be identified. As discussed above, the predetermined distance within which a first battery-operated device is susceptible to interference from a second battery-operated device in the network may vary based on the type of battery-operated device. For example, the predetermined distance may be larger if the second battery-operated device is a Wi-fi device than if the second battery-operated device is a Zigbee device because a Wi-fi device may operate in a broader frequency band than a Zigbee device.

The SNR and SIR for each battery-operated device in the network may be used to determine whether the battery life of the devices in the network, when viewed as a whole, would be improved by forcing the battery-operated devices in the network into CCA mode. If a noise is generated to force a device in the network into CCA mode, the noise may impact all devices in the network. If the noise impacts all devices in the network, each battery-operated device in the network may be forced into CCA mode even if the device is able to receive a signal. The SNR and SIR for each battery-operated device in the network may therefore be used to determine a net effect of forced CCA on the network.

For example, battery-operated devices that are able to receive a signal in the presence of network interference may nevertheless be forced into CCA mode. If a battery-operated device that is able to receive a signal in the presence of network interference is forced into CCA mode, that device may experience a positive battery savings because it is no longer transmitting packets. Likewise, battery-operated devices that are not able to receive a signal due to network interference and battery-operated devices that are not able to receive a signal due to background noise may also be forced into CCA mode. If a battery-operated device that is not able to receive a signal due to network interference or background noise is forced into CCA mode, that device may still experience a loss of battery life, but the loss may be less than it would otherwise be if the device were to operate in the "normal transmission" mode.

Figure 3:
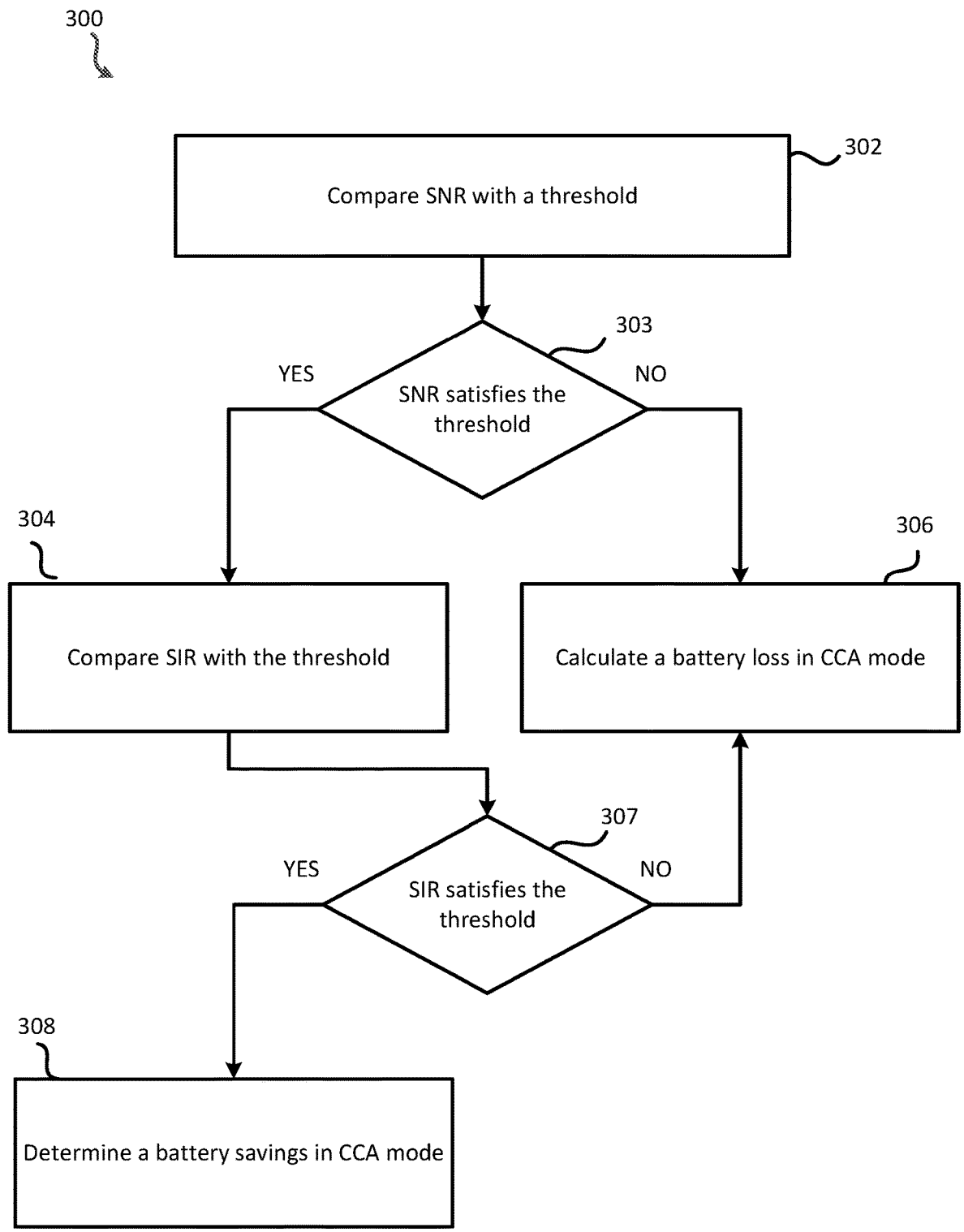
FIG. 3 illustrates a flow chart of an example method according to an embodiment of the present disclosure.

At step 206, a battery loss using CCA mode or a battery savings using CCA mode may be determined for each of the one or more battery-operated devices in the network. As discussed above, a battery loss using forced CCA mode may be determined for those battery-operated devices that are not able to receive a signal due to network interference or background noise. A battery savings may be determined for those battery-operated devices that are able to receive a signal despite to network interference. FIG. 3 shows a flow chart of an example method 300 for determining a battery loss using CCA mode or a battery savings using CCA mode. The method 300 may be performed for each of the one or more battery-operated devices in a network. The method 200 may then proceed to step 208 to determine a net effect of forced CCA on the network.

As discussed above, the SNR of a device may indicate if that device is able to receive a signal in the presence of background noise, without taking into account interference from other network devices operating on the same frequency band. At step 302 of method 300, the SNR of a device is compared with a threshold, such as a minimum signal requirement. The SNR of a device may satisfy the threshold if the device is able to receive an inbound signal is the presence of background noise, not taking into account interference from other network devices operating on the same frequency band. For example, a ZigBee device may satisfy the threshold if the Zigbee device has a SNR of 4 dB, because the ZigBee devices requires 4 dB SNR to receive an inbound signal, not taking into account interference from other network devices operating on the same frequency band. Different devices in a network, such as the network 100 shown in FIG. 1, may be associated with different thresholds. The threshold for each device may be determined based on a modulation used by that particular device. For example, the threshold for a Wi-Fi device may be larger than the threshold for a ZigBee device because a Wi-fi device may operate in a broader frequency band than a Zigbee device.

At step 303, it may be determined if the SNR for a device satisfies the threshold. If it is determined that the SNR for the device satisfies the threshold, the device may be able to receive a signal in the presence of background noise, without taking into account interference from other network devices operating on the same frequency band. If the device is able to receive a signal in the presence of background noise without taking into account interference from other network devices operating on the same frequency band, the device may also be able to receive a signal in the presence of interference from other network devices operating on the same frequency band. To determine whether the device is also able to receive a signal in the presence of interference from other network devices operating on the same frequency band, it may be determined whether the SIR for the device also satisfies the threshold. This determination may be made at step 304.

Conversely, if it is determined that the SNR of the device does not satisfy the threshold, this may indicate that the device is not able to receive a signal due to background noise. If the device is not able to receive a signal due to background noise, then the device will not be able to receive a signal in the presence of interference from other devices operating on the same frequency band. If the device is not able to receive a signal due to background noise, the device will inevitably be losing battery life if it is operating in a "normal transmission" mode. In the "normal transmission" mode, the device may be making repeated attempts to transmit packets to a receiver. As the device is not able to receive a signal, each of these attempts may be unsuccessful. Each unsuccessful attempt may reduce the battery life of the device. While the device will still lose battery life if it is operating in CCA mode, the loss of battery life will be minimized by forcing the device to operate in CCA mode rather than "normal transmission" mode. As discussed above, a device that has been forced into CCA mode will stop transmitting packets to the receiver, without ever having employed CCA. If the device stops making repeated, failed attempts to transmit packets to the receiver, the battery-life of the device may be improved. The loss of battery life for the device if the device is forced to operate in CCA mode may be determined at step 306.

At step 304, the SIR of the device is compared with a threshold. The SIR of the device may satisfy the threshold if the device is able to receive an inbound signal even in the presence of interference from the other battery-operated devices operating on the same frequency band. At step 305 it may be determined if the SIR satisfies the threshold. If the SIR for the device satisfies the threshold, then that device may not be losing battery life in a "normal transmission" mode, but there nevertheless may be an opportunity to save even more battery life for that device by forcing the device into CCA mode. However, if the device is forced into CCA mode, it will no longer transmit packets to the receiver as it would in the "normal transmission" mode. Accordingly, it may be beneficial to force the device into CCA mode if it is determined that the battery life of the devices in the network, when viewed as a whole, would be improved by forcing the battery-operated devices out of the "normal transmission" mode into CCA mode. If the SIR of the device satisfies the threshold, the method 300 may proceed to step 308 to determine the potential battery savings for the device if it is forced to operate in CCA mode.

Conversely, if the SIR of the device does not satisfy the threshold, then this indicates that the device is not able to receive a signal due to interference from the other battery-operated devices operating on the same frequency band. If the device is not able to receive a signal due to interference from other network devices operating on the same frequency band, the device will inevitably be losing battery life if it is operating in a "normal transmission" mode. In the "normal transmission" mode, the device may be making repeated attempts to transmit packets to a receiver. As the device is not able to receive a signal, one or more of these repeated attempts may be unsuccessful. Each unsuccessful retransmission may reduce the battery life of the device. While the device will still lose battery life if it is operating in CCA mode, the loss of battery life will be minimized by forcing the device to operate in CCA mode rather than "normal transmission" mode. As discussed above, a device that has been forced into CCA mode will stop transmitting packets to the receiver, without ever having employed CCA. If the device stops making repeated, failed attempts to transmit packets to the receiver, the battery-life of the device may be improved. The loss of battery life for the device if the device is forced to operate in CCA mode may be determined at step 306.

At step 306, a battery loss for a device may be determined when the device is operating in forced CCA mode. As discussed above, the battery loss using CCA may be determined for devices that have either a SNR or SIR that fails to satisfy threshold. If the device has a SNR or SIR that does not satisfy the threshold, the device is not able to receive a signal due to background noise or due to interference from other battery-operated devices operating on the same frequency band. If the device is not able to receive a signal, the device will lose battery life regardless of whether it is operating in a "normal transmission" mode or CCA mode. However, the device will lose less battery life in CCA mode than it would in the "normal transmission" mode. The battery loss for the device when the device is operating in CCA mode may be equal to the device's energy consumption when the device is operating in CCA mode.

At step 308, a battery savings for the device may be determined when the device is operating in forced CCA mode. As discussed above, the battery savings in CCA mode may be determined for devices that have both a SNR and SIR that satisfy the threshold. If the device is able to receive a signal in a "normal transmission" mode, the device may not necessarily be losing battery life in the "normal transmission" mode. However, regardless of whether the device is losing battery life in the "normal transmission" mode, the device may still maximize a savings of battery life by operating in CCA mode. The battery savings for a device when the device is operating in CCA mode may be equal to the device's energy consumption when the device is operating in CCA mode less the device's energy consumption during the "normal transmission" mode.

To determine whether the battery life of the devices in the network, when viewed as a whole, would be improved by forcing the battery-operated devices into CCA mode, a net effect of forced CCA on the network may be determined. The net effect of forced CCA on a network including battery-operated devices may be determined by comparing a total battery savings during forced CCA to a total battery loss during forced CCA. Referring back to FIG. 2, at step 208, a total battery savings may be compared to a total battery loss. By comparing the total battery savings to the total loss, it may be determined whether the battery life of the battery-operated devices in the network, when viewed as a whole, would be improved by forcing the battery-operated devices to operate in CCA mode. Comparing a total battery savings to a total battery loss may comprise summing each of the determined battery savings, such as each of the battery savings determined at step 308 of method 300, together to determine the total savings and summing each of the determined battery losses, such as the battery losses determined at step 306 of method 300, together to determine the total loss.

If the total battery savings is greater than the total battery loss, this may indicate that the battery life of the battery-operated devices in the network, when viewed as a whole, may be improved by forcing the battery-operated devices in the network to operate in CCA mode. To force the battery-operated devices to operate in CCA mode, a noise may be generated to block transmission from the battery-operated devices. At step 212, a noise signal may be generated to force the battery-operated devices to operate in CCA mode. To force the battery-operated devices to operate in CCA mode, the noise signal may block transmission from the one or more battery operated devices. The noise signal may be a continuous waveform. As discussed above, the noise may prevent transmission from each battery-operated device in the network, including battery-operated devices that were able to receive a signal in "normal transmission" mode.

Conversely, if the total battery loss is greater than the total battery savings, this may indicate that the battery life of battery-operated devices in the network may be maximized by allowing the battery-operated devices to operate in the "normal transmission" mode rather than CCA mode. The method 200 may proceed to step 214. At step 214, a noise may not be generated to block transmission from the one or more battery operated devices. If a noise is not generated to block transmission from the one or more battery-operated devices, the devices may remain operating in a "normal transmission" mode.

In a network, total battery savings may not be the top priority. For example, ensuring that a particular device in the network is able to transmit packets to the receiver may be the top priority. This particular device may be considered a "high priority" device. If At step 210, a priority may be assigned to each of the one or more battery-operated devices. One or more of the battery-operated devices may be assigned a higher priority than the other battery-operated devices. Higher priorities may be assigned to the one or more battery-operated devices whose functions are most important. For example, a home security device, such as an alarm system, may be assigned a higher priority than a home automation device because the home security device plays an important role in protecting the safety of its owner.

If a device is high priority, it may be more important that the high priority device be able to transmit packets to a receiver than it is to improve the overall battery-life of the battery-operated devices in the network. If it is more important that the high priority device be able to transmit packets to a receiver than it is to improve the overall battery-life of the battery-operated devices in the network, then the devices in the network may not be forced to operate in CCA mode. As discussed above, if a noise signal is generated to force a device in the network into CCA mode, that noise signal may force each device in the network into CCA mode. Accordingly, if a high priority device needs to transmit packets to a receiver, a noise signal may not be generated to force the devices in the network to operate in CCA mode. At step 214, a noise may not be generated to block transmission from the one or more battery operated devices. If a noise signal is not generated to block transmission from the battery-operated devices in the network, the high priority device, as well as the other devices in the network, may continue to operate in a "normal transmission" mode.

While the above described techniques may be used to maximize total battery savings of devices in a network, the above described techniques may also be used to force a single device into CCA mode without ever needing to perform a CCA assessment. It may be determined that a single device would benefit from being forced into CCA mode. For example, it may be determined that the battery life of that device may benefit from being forced into CCA mode.

The determination that the single device would benefit from being forced into CCA mode may be made using the SIR and SNR of the device. As discussed above, the SNR of the device may indicate if that device is able to receive a signal in the presence of background noise, without taking into account interference from other network devices operating on the same frequency band. The SIR for the device may indicate whether the device is capable of receiving an inbound signal in the presence of interference from other devices operating on the same frequency band. If one or more of the SNR or the SIR for the device does not satisfy a threshold, then this may indicate that the device would benefit from being forced into CCA mode. A noise may be generated to force the device into CCA mode. This noise may cause other devices in the network to also be forced into CCA mode without ever performing CCA assessments.

Figure 4:
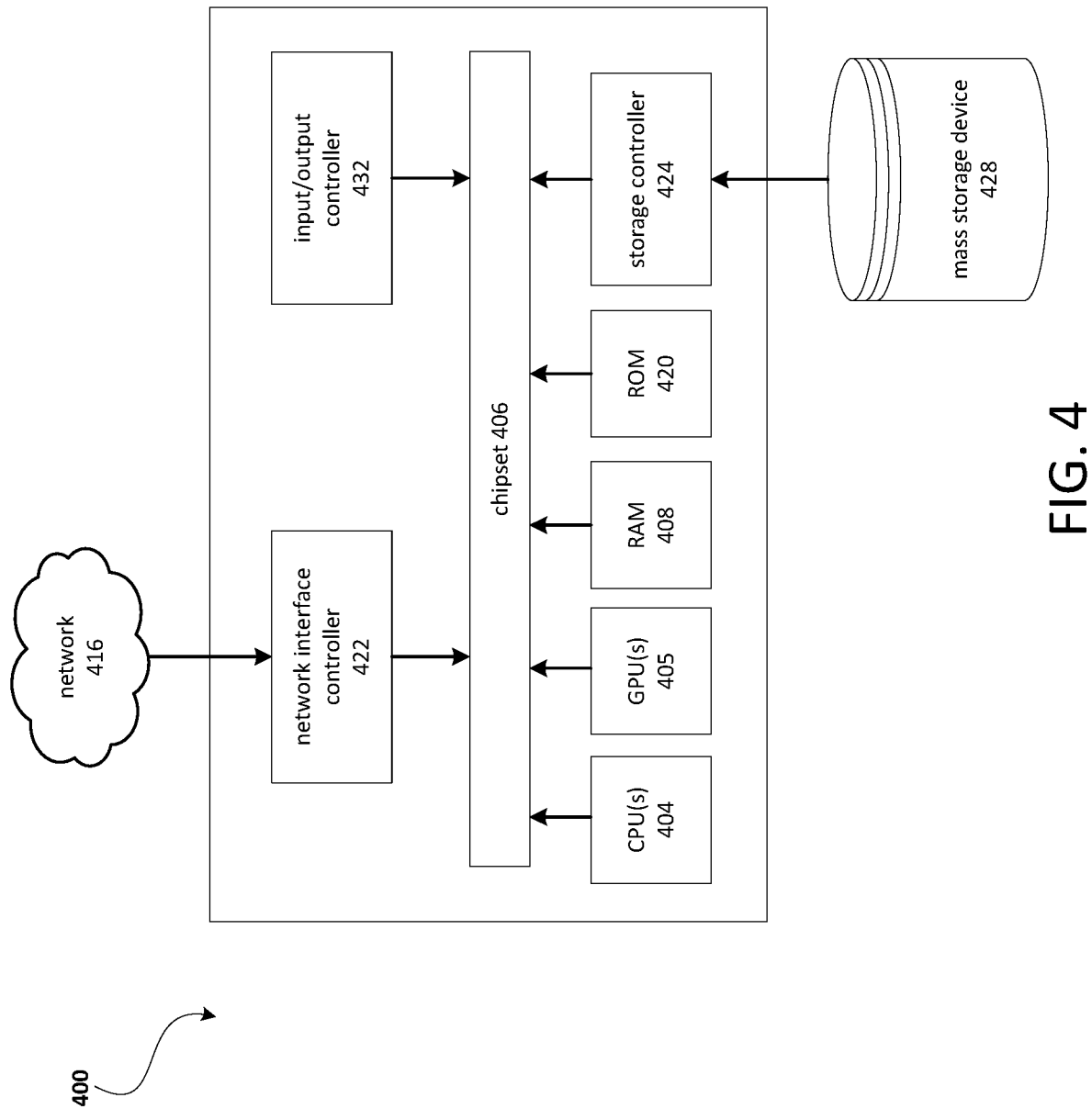
FIG. 4 illustrates a block diagram of an example computing device according to an embodiment of the present disclosure.

FIG. 4 depicts a computing device that may be used in various aspects, such as the devices depicted in FIG. 1. With regard to the example system of FIG. 1, the battery-operated devices 110*a-e* and the non-battery-operated devices 115*a-b* may each be implemented in an instance of a computing device 400 of FIG. 4. The computer architecture shown in FIG. 4 shows a conventional server computer, workstation, desktop computer, laptop, tablet, network appliance, PDA, e-reader, digital cellular phone, or other computing node, and may be utilized to execute any aspects of the computers described herein, such as to implement the methods described in FIGS. 2-3.

The computing device 400 may include a baseboard, or "motherboard," which is a printed circuit board to which a multitude of components or devices may be connected by way of a system bus or other electrical communication paths. One or more central processing units (CPUs) 404 may operate in conjunction with a chipset 406. The CPU(s) 404 may be standard programmable processors that perform arithmetic and logical operations necessary for the operation of the computing device 400.

The CPU(s) 404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 404 may be augmented with or replaced by other processing units, such as GPU(s) 405. The GPU(s) 405 may comprise processing units specialized for but not necessarily limited to highly parallel computations, such as graphics and other visualization-related processing.

A user interface may be provided between the CPU(s) 404 and the remainder of the components and devices on the baseboard. The interface may be used to access a random access memory (RAM) 408 used as the main memory in the computing device 400. The interface may be used to access a computer-readable storage medium, such as a read-only memory (ROM) 420 or non-volatile RAM (NVRAM) (not shown), for storing basic routines that may help to start up the computing device 400 and to transfer information between the various components and devices. ROM 420 or NVRAM may also store other software components necessary for the operation of the computing device 400 in accordance with the aspects described herein. The user interface may be provided by a one or more electrical components such as the chipset 406.

The computing device 400 may operate in a networked system using logical connections to remote computing nodes and computer systems through local area network (LAN) 416. The chipset 406 may include functionality for providing network connectivity through a network interface controller (NIC) 422, such as a gigabit Ethernet adapter. A NIC 422 may be capable of connecting the computing device 400 to other computing nodes over a network 416. It should be appreciated that multiple NICs 422 may be present in the computing device 400, connecting the computing device to other types of networks and remote computer systems.

The computing device 400 may be connected to a storage device 428 that provides non-volatile storage for the computer. The storage device 428 may store system programs, application programs, other program modules, and data, which have been described in greater detail herein. The storage device 428 may be connected to the computing device 400 through a storage controller 424 connected to the chipset 406. The storage device 428 may consist of one or more physical storage units. A storage controller 424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 400 may store data on a storage device 428 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 428 is characterized as primary or secondary storage and the like.

For example, the computing device 400 may store information to the storage device 428 by issuing instructions through a storage controller 424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 may read information from the storage device 428 by detecting the physical states or characteristics of one or more particular locations within the physical storage units.

In addition or alternatively to the storage device 428 described herein, the computing device 400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 428 depicted in FIG. 4, may store an operating system utilized to control the operation of the computing device 400. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 428 may store other system or application programs and data utilized by the computing device 400.

The storage device 428 or other computer-readable storage media may also be encoded with computer-executable instructions, which, when loaded into the computing device 400, transforms the computing device from a general-purpose computing system into a special-purpose computer capable of implementing the aspects described herein. These computer-executable instructions transform the computing device 400 by specifying how the CPU(s) 404 transition between states, as described herein. The computing device 400 may have access to computer-readable storage media storing computer-executable instructions, which, when executed by the computing device 400, may perform the methods described in relation to FIGS. 2-3.

A computing device, such as the computing device 400 depicted in FIG. 4, may also include an input/output controller 432 for receiving and processing input from a number of input devices, such as a keyboard, a mouse, a touchpad, a touch screen, an electronic stylus, or other type of input device. Similarly, an input/output controller 432 may provide output to a display, such as a computer monitor, a flat-panel display, a digital projector, a printer, a plotter, or other type of output device. It will be appreciated that the computing device 400 may not include all of the components shown in FIG. 4, may include other components that are not explicitly shown in FIG. 4, or may utilize an architecture completely different than that shown in FIG. 4.

As described herein, a computing device may be a physical computing device, such as the computing device 400 of FIG. 4. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as determined data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method comprising:
   determining, by a computing device, that a battery-operated device, when operating in a clear channel assessment (CCA) mode, is associated with a battery savings; and
   causing, based on the determination that the battery-operated device, when operating in the CCA mode, is associated with the battery savings, generation of a noise to cause the battery-operated device to operate in the CCA mode.

2. The method of claim 1, wherein determining that the battery-operated device, when operating in the CCA mode is associated with the battery savings, comprises determining that a signal-to-noise ratio (SNR) and a signal-to-interference ratio (SIR) associated with the battery-operated device both satisfy a threshold.

3. The method of claim 2, wherein determining that the SNR and the SIR associated with the battery-operated device both satisfy the threshold comprises:
   comparing the SNR associated with the battery-operated device to the threshold; and
   based on the SNR satisfying the threshold, comparing the SIR associated with the battery-operated device to the threshold.

4. The method of claim 2, wherein the threshold for the battery-operated device is determined based on a modulation used by the battery-operated device.

5. The method of claim 2, further comprising determining the battery savings by subtracting an energy use associated with the battery-operated device during normal transmission from an energy use associated with the battery-operated device operating in CCA mode.

6. The method of claim 2, wherein the battery-operated device comprises a ZigBee device, and wherein the threshold is 4 dB.

7. The method of claim 2, further comprising determining the SNR and the SIR for the battery-operated device based on a distance from the battery-operated device to the computing device.

8. The method of claim 7, wherein the computing device comprises two or more antennas, and wherein determining the distance from the battery-operated device to the computing device comprises:
   determining an angle between the battery-operated device and the computing device, wherein the angle is determined using an angle of arrival (AoA) for a signal transmitted from the battery-operated device to the computing device.

9. The method of claim 1, wherein the battery-operated device comprises at least one of a Wi-Fi device, a ZigBee device, a Bluetooth Low Energy (BLE) device, or a Thread device.

10. The method of claim 1, wherein the noise comprises a continuous waveform.

11. A device comprising:
    one or more processors; and
    memory storing instructions that, when executed by the one or more processors, cause the device to:
       determine that a battery-operated device, when operating in a clear channel assessment (CCA) mode, is associated with a battery savings; and
       cause, based on the determination that the battery-operated device, when operating in the CCA mode, is associated with the battery savings, generation of a noise to cause the battery-operated device to operate in the CCA mode.

12. The device of claim 11, wherein the instructions that, when executed by the one or more processors, cause the device to determine that the battery-operated device, when operating in the CCA mode, is associated with the battery savings comprise instructions that cause the device to determine that a signal-to-noise ratio (SNR) and a signal-to-interference ratio (SIR) associated with the battery-operated device both satisfy a threshold.

13. The device of claim 12, wherein the instructions that, when executed by the one or more processors, cause the device to determine that the SNR and the SIR associated with the battery-operated device both satisfy the threshold comprise instructions that cause the device to:
    compare the SNR associated with the battery-operated device to the threshold; and
    based on the SNR satisfying the threshold, compare the SIR associated with the battery-operated device to the threshold.

14. The device of claim 12, wherein the threshold for the battery-operated device is determined based on a modulation used by the battery-operated device.

15. The device of claim 12, wherein the instructions that, when executed by the one or more processors, further cause the device to determine the battery savings by subtracting an energy use associated with the battery-operated device during normal transmission from an energy use associated with the battery-operated device operating in CCA mode.

16. The device of claim 12, wherein the battery-operated device comprises a ZigBee device, and wherein the threshold is 4 dB.

17. The device of claim 12, wherein the instructions that, when executed by the one or more processors, further cause the device to determine the SNR and the SIR for the battery-operated device based on a distance from the battery-operated device to the computing device.

18. The device of claim 17, wherein the computing device comprises two or more antennas, and wherein the instructions that, when executed by the one or more processors, cause the device to determine the distance from the battery-operated device to the computing device comprise instructions that cause the device to determine an angle between the battery-operated device and the computing device, wherein the angle is determined using an angle of arrival (AoA) for a signal transmitted from the battery-operated device to the computing device.

19. The device of claim 11, wherein the battery-operated device comprises at least one of a Wi-Fi device, a ZigBee device, a Bluetooth Low Energy (BLE) device, or a Thread device.

20. The device of claim 11, wherein the noise comprises a continuous waveform.

21. A non-transitory computer-readable medium storing instructions that, when executed, cause:
    determining, by a computing device, that a battery-operated device, when operating in a clear channel assessment (CCA) mode, is associated with a battery savings; and
    causing, based on the determination that the battery-operated device, when operating in the CCA mode, is associated with the battery savings, generation of a noise to cause the battery-operated device to operate in the CCA mode.

22. The non-transitory computer-readable medium of claim 21, wherein the instructions, that when executed, cause determining that the battery-operated device, when operating in the CCA mode, is associated with the battery savings comprise instructions that, when executed, cause determining that a signal-to-noise ratio (SNR) and a signal-to-interference ratio (SIR) associated with the battery-operated device both satisfy a threshold.

23. The non-transitory computer-readable medium of claim 22, wherein the instructions, that when executed, cause determining that the SNR and the SIR associated with the battery-operated device both satisfy the threshold comprise instructions that, when executed, cause:
comparing the SNR associated with the battery-operated device to the threshold; and
based on the SNR satisfying the threshold, comparing the SIR associated with the battery-operated device to the threshold.

24. The non-transitory computer-readable medium of claim 22, wherein the threshold for the battery-operated device is determined based on a modulation used by the battery-operated device.

25. The non-transitory computer-readable medium of claim 22, wherein the instructions, when executed, further cause determining the battery savings by subtracting an energy use associated with the battery-operated device during normal transmission from an energy use associated with the battery-operated device operating in CCA mode.

26. The non-transitory computer-readable medium of claim 22, wherein the battery-operated device comprises a ZigBee device, and wherein the threshold is 4 dB.

27. The non-transitory computer-readable medium of claim 22, wherein the instructions, when executed, further cause determining the SNR and the SIR for the battery-operated device based on a distance from the battery-operated device to the computing device.

28. The non-transitory computer-readable medium of claim 27, wherein the computing device comprises two or more antennas, and wherein the instructions, that when executed, cause determining the distance from the battery-operated device to the computing device comprise instructions that cause:
determining an angle between the battery-operated device and the computing device, wherein the angle is determined using an angle of arrival (AoA) for a signal transmitted from the battery-operated device to the computing device.

29. The non-transitory computer-readable medium of claim 21, wherein the battery-operated device comprises at least one of a Wi-Fi device, a ZigBee device, a Bluetooth Low Energy (BLE) device, or a Thread device.

30. The non-transitory computer-readable medium of claim 21, wherein the noise comprises a continuous waveform.

* * * * *